(12) United States Patent
Gardner et al.

(10) Patent No.: US 6,950,574 B2
(45) Date of Patent: Sep. 27, 2005

(54) ANGLE TUNING WAVELENGTH SENSITIVE FILTERS USING A VARIABLE FOCAL LENGTH LENS

(75) Inventors: Timothy S. Gardner, Eden Prairie, MN (US); Ronald E. Gerber, Richfield, MN (US); Edward C. Gage, Apple Valley, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 242 days.

(21) Appl. No.: 10/207,573

(22) Filed: Jul. 29, 2002

(65) Prior Publication Data

US 2004/0017969 A1 Jan. 29, 2004

(51) Int. Cl.[7] .................................................. G02B 6/32
(52) U.S. Cl. ............................ 385/33; 385/31; 359/642
(58) Field of Search ............................. 385/33, 34, 31; 359/642

(56) References Cited

U.S. PATENT DOCUMENTS

| | | | |
|---|---|---|---|
| 5,583,683 A | * | 12/1996 | Scobey .......................... 398/79 |
| 5,612,824 A | | 3/1997 | Si et al. |
| 5,799,121 A | | 8/1998 | Duck et al. |
| 5,917,626 A | | 6/1999 | Lee |
| 6,175,453 B1 | * | 1/2001 | Lee et al. .................... 359/687 |

FOREIGN PATENT DOCUMENTS

JP        2001-021755    *   1/2001  ............. G02B/6/32

OTHER PUBLICATIONS

U.S. Appl. No. 09/999,891, "Dual Fiber Collimator Assembly Pointing Control".

* cited by examiner

*Primary Examiner*—Jennifer Doan
(74) *Attorney, Agent, or Firm*—Carlson, Caspers, Vandenburgh & Lindquist

(57) ABSTRACT

The invention relates to an approach to angle tuning a thin film, interference filter device in which light is delivered to the filter from a fiber lying off-axis relative to the filter, and to a method of optically coupling such a device. The optical device comprises a lens unit having an optical axis and an adjustable effective focal length. The device also includes a first port disposed on a first side of the lens unit and on a first side of the optical axis, and an optical element disposed on the second side of the lens unit. The optical element has an optical characteristic that is dependent on the angle of incidence on the optical element. The lens unit has an adjustable focal length so light from the first port is incident on the optical element at a desired angle.

15 Claims, 4 Drawing Sheets

ANGLE TUNING WAVELENGTH SENSITIVE FILTERS USING A VARIABLE FOCAL LENGTH LENS

FIELD OF THE INVENTION

The present invention is directed generally to optical devices and more particularly to angle tuned devices useful in optical communications.

BACKGROUND

In the field of optical telecommunications, information is transmitted optically over a network of single-or multi-mode fibers. Many of the switching and splitting functions in the network are accomplished in free space. For free space propagation, the light is allowed to exit the fiber, typically a single mode fiber, and is then collimated by a lens. The collimated light beam then interacts with the switching and/or splitting elements, such as a narrowband interference filter. Once the free space interaction is complete, the light is then focused back down to a fiber for continued guided propagation.

One type of free-space splitting element commonly used in optical communications applications is a thin film, narrowband filter, which typically is highly reflecting for a particular channel in a multiple channel optical signal. The filter is used to reflect light in the wavelength band of the particular channel, while transmitting the remainder of the light. The free-space reflected light and transmitted light are typically then focused into respective fibers once the particular channel has been split out of the multiple channel signal.

The definitions of channel wavelength and bandwidth set by the International Telecommunications Union (ITU) are relatively strict, resulting in strict tolerances on the bandwidth and center wavelength of the thin film filter. Thin film interference filters that exactly match the center wavelength and bandwidth at a particular angle of incident light, however, are expensive to manufacture. One approach to reducing the expense is to use a less expensive filter, for which the center wavelength is less precise, and to vary the angle at which the light is incident on the filter. This process is referred to as angle tuning, and is often recommended by manufacturers of thin film filters.

In some geometries, the filter is angle tuned by rotating the filter about an axis perpendicular to the direction of propagation of the light. In another geometry, the incoming light is delivered to the filter from a fiber that is held by a ferrule in an off-axis position relative to the collimating lens. The angle of incidence can be adjusted by changing the offset of the fiber from the lens axis. This requires that the fiber be held in an adjustable ferrule, or that a number of ferrules with different offsets are available for putting the device together.

SUMMARY OF THE INVENTION

The present invention is directed to a new approach to angle tuning a thin film, interference filter device in which the light is delivered to the filter from a fiber lying off-axis relative to the filter. In the present invention, the fiber offset from the lens axis may remain fixed, thus avoiding the need for an adjustable ferrule or a number of different ferrules.

Instead, according to the present invention, the device is angle tuned by adjusting the focal length of the lens that collimates the light from the fiber.

One particular embodiment of the invention is directed to an optical device comprising a lens unit having an optical axis and an adjustable effective focal length. The optical device includes a first port disposed on a first side of the lens unit and on a first side of the optical axis, and an optical element disposed on the second side of the lens unit, the optical element having an optical characteristic that is dependent on the angle of incidence on the optical element. Wherein the lens unit has an adjustable focal length adjusted so that light from the first port is incident on the optical element at a desired optical characteristic of the optical element.

Another embodiment of the invention is directed to a method of optical coupling in a fiber collimator unit. The method includes providing a lens unit which defines the optical axis of the collimator unit and which has an effective focal length. Light is directed substantially parallel to the optical axis from a first optical port disposed on a first side of the lens unit and on a first side of the optical axis. The generated light beam is directed towards the optical axis and is incident on an optical element having an optical characteristic that is dependent on the angle of incidence. The effective focal length of the lens unit is selected so as to select the angle of incidence of light on the optical element.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
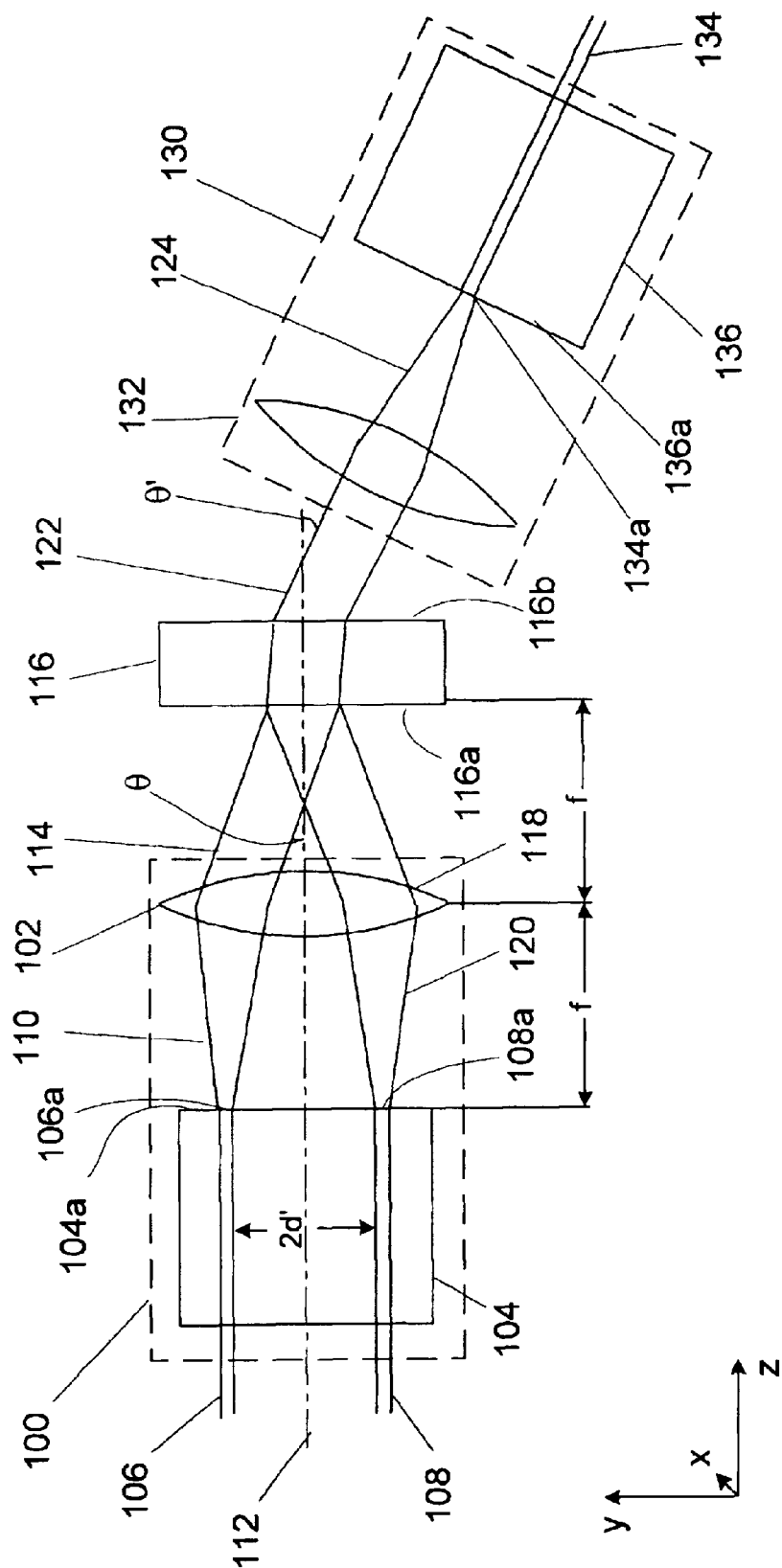
FIG. 1 schematically illustrates a three port, fiber optic device.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In general, the present invention is directed to a hybrid optical fiber device, and is believed to be particularly useful for angle tuning optical devices that have a wavelength characteristic that is dependent on the angle of incidence.

One design of the wavelength selective device uses a dual fiber collimator (DFC), in which the input light from a first fiber is directed to an interference filter, and light reflected from the filter is directed to a second fiber held in the same ferrule as the first fiber. A common lens collimates the light from the first fiber and focuses the reflected light to the second fiber. Such a design is shown in FIG. 1, which illustrates a three port filter-based optical device. The device may be a multiplexer/demultiplexer, add/drop filter, power tap, or the like. The DFC collimator 100 includes a first lens 102 and dual-fiber ferrule 104. Two fibers 106 and 108 are held in the ferrule 104, with their ends 106a and 108a positioned at a distance from the lens 102 equal to about the focal length of the lens 102. The ferrule end 104a, and the fiber ends 106a and 108a may be polished at a small angle to prevent reflections feeding to other elements.

In the illustrated embodiment, a first light beam 110 from the first fiber 106, passes through the lens 102 and is collimated. However, since the beam 110 is not positioned on the lens axis 112, the collimated beam 114 propagates at an angle, θ, to the axis 112. The collimated beam 114 is incident on the optical element 116, which may be an interference filter. The element 116 reflects the reflected beam 118 and transmits a transmitted beam 122. The reflected beam 118 is reflected to the first lens 102 which focuses the beam 120 to the second fiber 108. The first and second fibers 106 and 108 are each separated from the axis 112 by a distance d, so the separation between the centers of the two fibers 106 and 108 is 2d.

The transmitted beam 122 is passed from the optical element 116 to a single fiber collimating unit 130 (SFC), which is another important building block for fiber optical systems. The SFC includes a lens 132 and a third fiber 134 which is held in a single fiber ferrule 136. When used in conjunction with the DFC 100 and the optical element 116, the transmitted beam 122 is focused by the lens 132 into the third fiber 134 as beam 124. The transmitted beam 122 typically propagates from the optical element 116 at the angle, θ, to the axis 112. The SFC 130 may be tilted by angle θ', relative to the axis 112, during alignment to beam 122. For typical systems, the value of θ' may be around 2°, depending on such factors as the focal length of the lens 102 and the separation between the two fibers 106 and 108. The ferrule end 136a and the fiber end 134a may be polished at a small angle to prevent reflections feeding back to other elements.

The optical element 116 may be a filter having a multi-layer dielectric filter coating, typically on the first surface 116a, with the second surface 116b having an anti-reflection coating. The element 116 may be, for example, a wavelength dependent beamsplitter. This is useful for multiplexing/demultiplexing, or adding or dropping channels in a WDM or DWDM optical communications system. The element 116 may also split off a fraction of the incident light without regard to wavelength, in order to make a power measurement. The element 116 may also perform other functions.

In the embodiment illustrated in FIG. 1, the two surfaces 116a and 116b of the element 116 are nominally parallel. The element 116 may be wedged at a small angle, on the order of 1° or less, so that reflections from the second side 116b do not propagate along the same direction as the reflected beam 118, thus preventing etalon effects being produced by the front and back surfaces 116a and 116b. Furthermore, the element 116 may be wedged at a larger angle so that the transmitted beam 122 emerges from the element 116 in a direction substantially parallel with the axis 112, as is described in greater detail in U.S. patent application Ser. No. 09/999,891, titled "DUAL FIBER COLLIMATOR ASSEMBLY POINTING CONTROL", filed on Oct. 31, 2001 by Edward Gage, Timothy Gardner, Ronald Gerber and John Taranto, incorporated herein by reference.

Because a module that uses these dual fiber collimator subassemblies may have multiple outputs that perform multiple tasks, they are known as "hybrid" devices. These hybrids often combine the functions of several simpler devices into one compact device, with multiple input and output fibers.

Three factors are important in determining the proper alignment of a DFC. First, the fibers 106 and 108 in the dual fiber ferrule 104 should be located near the front focal plane of the lens 102. Second, the reflecting surface 116a of the element 116 should be located near the back focal plane of the lens 102. Third, the axis 112 through the center of the lens 102, perpendicular to the reflecting surface of the element 116, should lie mid-way between the fibers 106 and 108 in the ferrule 104.

Assuming that the lens 102 and element 116 have been properly placed in a mechanical housing, the final alignment step of the dual fiber collimator is a translation of the dual fiber ferrule 104 in all three dimensions, x, y, and z, relative to the lens 102. Commercial tools are available for performing this final alignment step. The tool sends light down one fiber, for example fiber 106, and monitors the light reflected into the other fiber, fiber 108, then translates the ferrule in all three dimensions, x, y, and z, until the reflected light detected through fiber 108 is maximized.

A natural consequence of this alignment procedure is that the angle of incidence (θ) on the filter is approximately equal to one half of the separation between the fibers in the ferrule (d) divided by the focal length of the lens (f). In other words, the condition for the angle of incidence on the filter, for small angles, is:

$$\theta = \frac{d}{f} \qquad (1)$$

The thin film coatings on the element 116 are typically designed for this angle of incidence, θ.

Where the element 116 is a wavelength-sensitive filter, the coatings are often quite complicated, and the wavelength properties of the manufactured coating often differ slightly from those at which it was designed. For example, a notch filter may have its center and edge wavelengths all shifted to a longer or shorter wavelength than the design values, due to some factor related to the manufacturing process. This shifting in wavelength is common for difficult filters, and is easily remedied in most cases by changing the angle of incidence, θ, on the filter. The element 116 is tilted in its mount with respect to the incident beam 114 until the spectral properties of the element, in other words the center and edge wavelengths of the reflection or transmission spectrum, match the desired parameters. This process is known as "angle tuning".

Unfortunately, tilting the element 116 to perform angle tuning does not work for dual-fiber collimators. If the element 116 is tilted, the subsequent alignment steps return the angle of incidence, θ. to the value given by equation (1). Because of the geometry of a dual-fiber collimator, θ is always equal to d/f, regardless of the amount of tilt in element 116.

In practice, it is generally desired to adjust the spectral properties of the filter 116. The incident angle may be changed by either changing the spacing between the fibers, 2d, or by changing the focal length of the lens, f. Changing either d or f results in a change in the incident angle, θ, as given by equation (1).

Prior approaches to changing the angle of incidence on the element 116 have concentrated on adjusting the distance between the fibers, in other words in altering the value of d, for example to d'. For example, one may select one ferrule from a group of binned ferrules that have discrete values of d, thus selecting the value of d that fixes the spectral properties of a given filter. In another approach, the value of d in a particular ferrule may be adjustable.

It is possible, however, to alter the focal length, f, to accommodate changes in the angle of incidence, θ, on the element 116. By adjusting the focal length f, the angle of incidence is altered and it is possible to tune a wavelength-sensitive filter element that might otherwise be unusable in a dual fiber collimator.

Different approaches may be followed for setting the focal length of the lens 102 to a desired value. One approach is to select a lens out of a series of binned lenses, each with a discrete focal length. Another approach is to replace the fixed lens with a zoom lens having an adjustable focal length.

The approach using binned lenses is fairly straightforward. The tolerance on the center and edge wavelengths in the filter element may be obtained from the manufacturer. The relationship between shift in wavelength and angle of incidence may be determined from a knowledge of the filter design. The element may then be tested to determine the actual operational wavelength for a particular angle of incidence. The values of angle of incidence required to use the filter element at different values of wavelength may then be calculated. The focal lengths of the lenses required to achieve the desired angles of incidence, for a selected value of d, may then be determined using equation (1). Therefore, in this approach, it is possible to create a table of lens focal lengths that correspond to different operational wavelengths for a particular filter element, for a fixed value of d and a fixed orientation of the element.

It is often useful to be able to adjust the angle of incidence, θ, on the filter element 116 in increments of 0.1°. Where the focal length, f, of the lens 102 is in the range of one to a few mm, an adjustment in the angle of incidence, θ, of 0.1° corresponds to an increment in focal length of about 100 μm. In other words, in this approach using binned lenses, the lens used in a particular DFC may be selected from binned lenses having focal lengths of 1.9 mm, 2.0 mm, 2.1 mm, and so on. For typical designs of filter element 116, angle tuning by ±0.1° may result in a change of operational wavelength by about ±0.04 nm.

Turning now to the approach using zoom lenses, the design of a conventional zoom lens system typically uses three optical elements, where a negative lens element is positioned on an optical axis between two positive lens elements. In many designs, the two positive lens elements are fixed in space, and the negative lens element is translatable along the optical axis. As the negative lens element is moved, the focal length of the lens system changes while the image plane of the lens system remains in approximately the same location.

Figure 2:
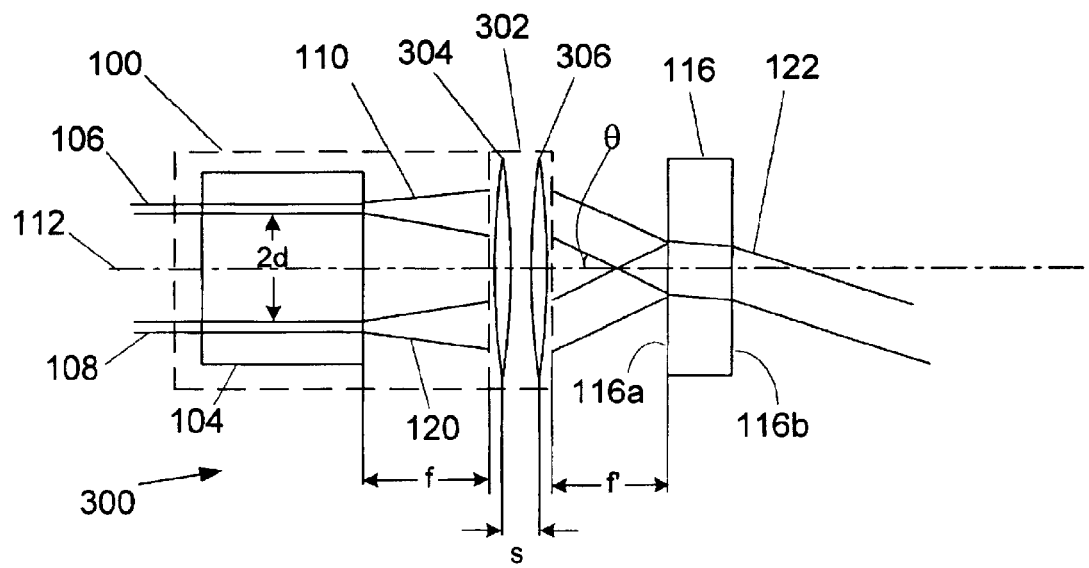
FIG. 2 schematically illustrates a dual fiber collimator having a lens unit with adjustable focal length, according to an embodiment of the invention.

In the present invention, however, it is not necessary to have all three elements, and two focusing elements may be sufficient, so long as one of them is a positive lens. A schematic of a dual fiber collimator 300 that includes a multiple-element zoom lens system 302 is shown in FIG. 2. Elements in the figure that are similar to those from earlier figures are labeled with the same reference numbers. In this particular embodiment, the zoom lens system 302 includes two focusing elements 304 and 306, although it will be appreciated that zoom lens systems that incorporate more lenses may also be used.

The back focal length of the zoom lens system 302 is f', and f' changes as the spacing between the lenses 304 and 306 is varied. By setting the spacing between lenses, s, to a pre-determined value, a given value of focal length is achieved, resulting in a particular angle of incidence, θ, on the filter element 116. It will be appreciated that the zoom lens system need not be symmetrical, so the lenses 304 and 306 need not have the same focal power. Furthermore, the back and front focal lengths, f' and f, of the zoom lens system 302 need not be the same.

Figure 3:
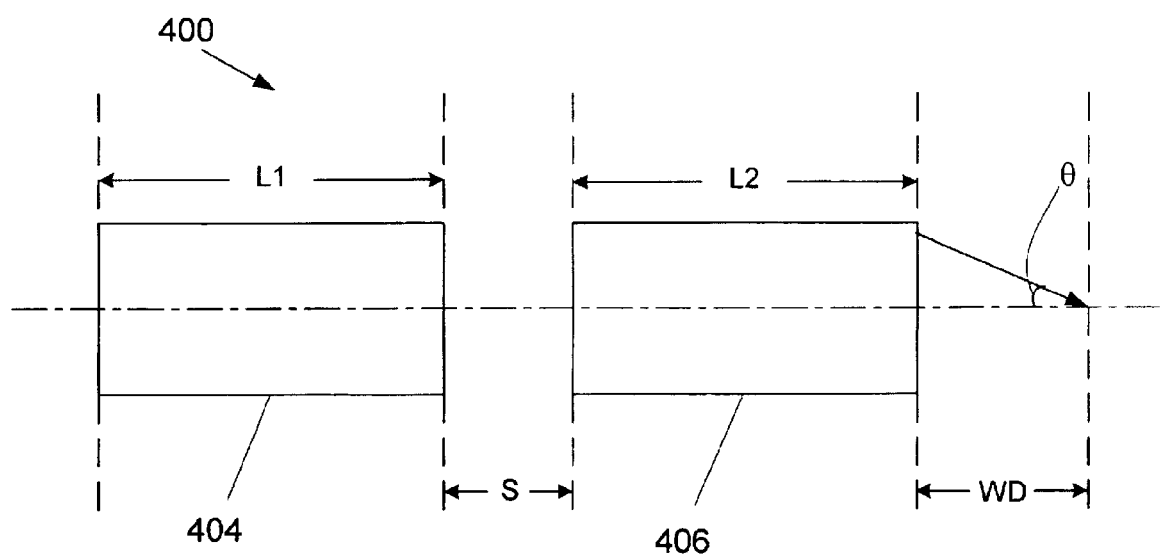
FIG. 3 schematically illustrates a lens unit having adjustable focal length, formed from two GRIN lenses according to an embodiment of the invention.
Figure 4:
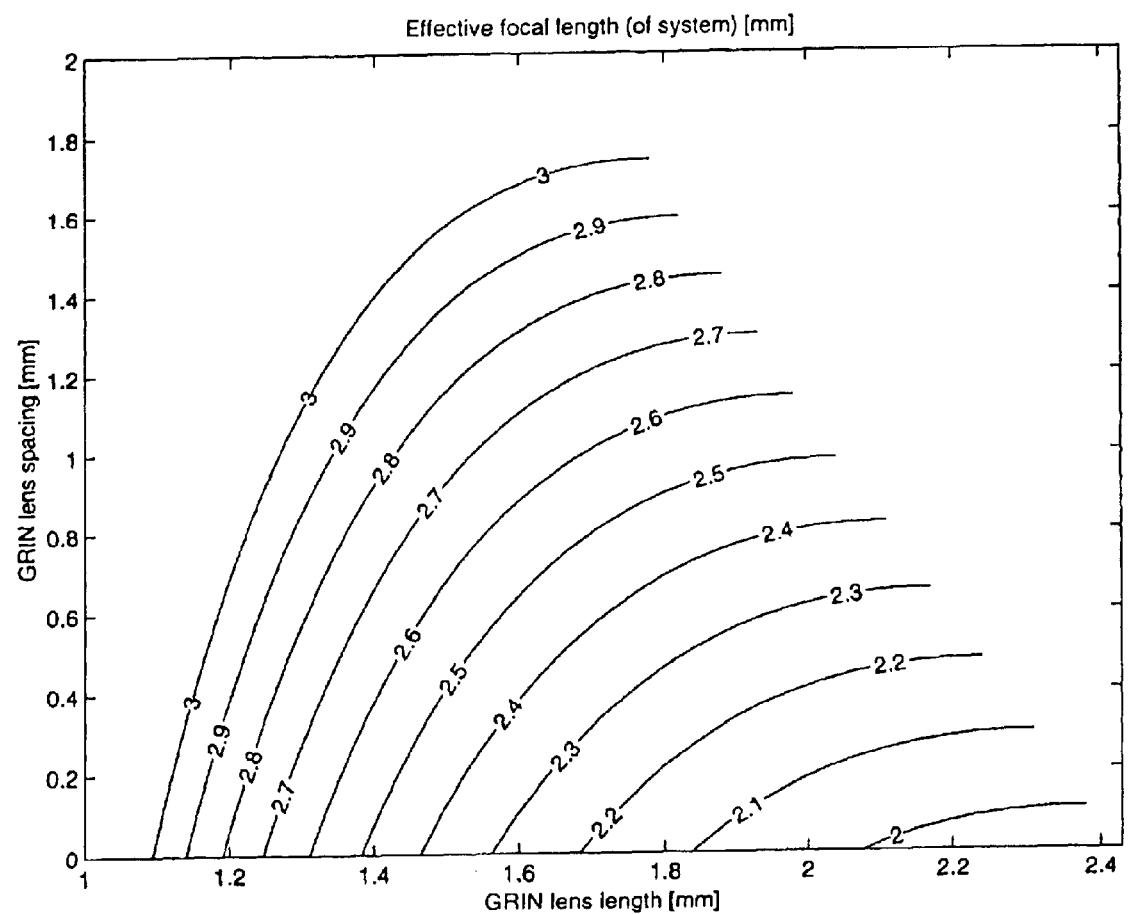
FIG. 4 is a graph showing effective focal length of the lens unit of FIG. 4 as a function of lens length and inter-lens separation.
Figure 5:
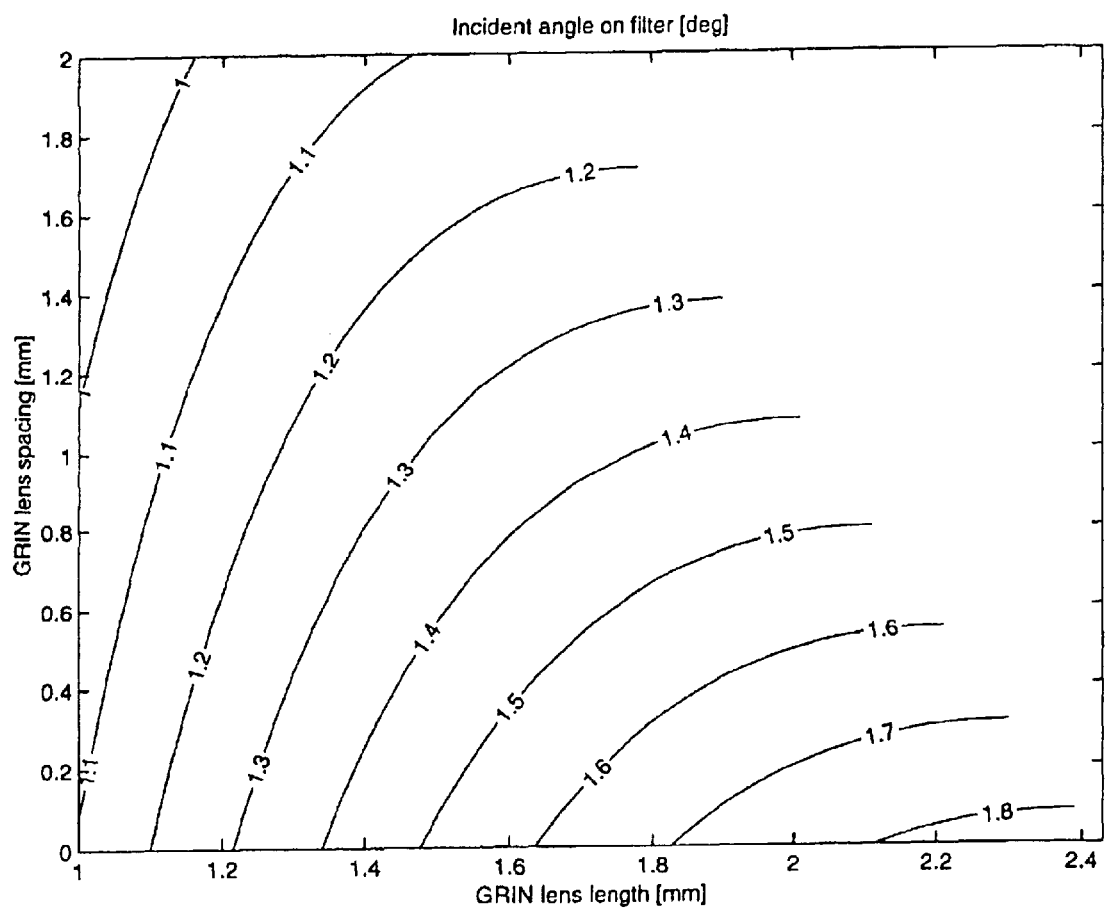
FIG. 5 is a graph showing effective focal length of the lens unit of FIG. 4 and the resulting angle of incidence on an optical element as a function of lens length and inter-lens separation.

One example of a zoom lens system is schematically presented in FIG. 3. The system uses two GRIN lenses 404 and 406 separated by a distance s. The length of the first lens 404 is L1 and the length of the second lens 406 is L2. The effective focal length of such a zoom lens system is dependent on the values of the lengths L1 and L2, and on the value of the separation, s. A graph is presented in FIG. 4, showing the calculated effective focal length of the lens system as a function of lens length and lens spacing. It was assumed that L1=L2. A graph is presented in FIG. 5 showing the calculated incident angle, θ, as a function of lens length and lens separation.

Changing the separation between the lenses results in a significant change in the effective focal length of the lens system, with a concomitant change in the incident angle, θ. For example, where the length of the lenses is selected to be 1.5 mm, the effective focal length may be varied between about 2.2 mm and 3 mm, by changing the lens separation from 0 mm to about 1.8 mm. The angle of incidence on the filter element 116 is varied between about 1.5° and 1.2°. Where the operational wavelength of a filter element varies by about 0.04 nm for a 0.1° change in angle of incidence, this range of angles results in tuning the filter element over a wavelength range of about 0.11 nm. A greater range of angles may be achieved if different lens elements are used.

It will be appreciated that conventional lenses, for example spherical or aspherical lenses, may be used in the zoom lens system, instead of GRIN lenses.

As noted above, the present invention is applicable to optical devices and is believed to be particularly useful for angle tuned devices in optical communications. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:
1. An optical device, comprising:
   a zoom lens unit having an optical axis therethrough, the zoom lens unit having an adjustable focal length;
   a first port disposed on a first side of the lens unit and on a first side of the optical axis; and
   an optical element disposed on a second side of the lens unit, the optical element having an optical characteristic that is dependent on an angle of incidence on the optical element;

wherein the zoom lens unit has a focal length adjusted so that light from the first port is incident on the optical element at a desired angle of incidence so as to achieve a desired optical characteristic of the optical element.

2. A device as recited in claim 1, wherein the zoom lens unit comprises at least first and second lenses, a separation distance between the first and second lenses being adjustable so as to adjust the effective focal length of the zoom lens unit.

3. A device as recited in claim 2, wherein the first and second lenses are GRIN lenses.

4. A device as recited in claim 2, wherein the first and second lenses have curved refracting surfaces.

5. A device as recited in claim 1, wherein the first port includes an optical fiber.

6. A device as recited in claim 1, further comprising a second port disposed on the first side of the lens unit and on a second side of the optical axis.

7. A device as recited in claim 6, wherein the second port includes an optical fiber.

8. A device as recited in claim 1, further comprising a third port, the optical element being disposed between the lens unit and the third port.

9. A device as recited in claim 8, wherein the third port includes an optical fiber, and further comprising a light focusing unit disposed between the optical element and the optical fiber to focus light transmitted through the optical element form the first port to the third port.

10. A device as recited in claim 1, wherein the optical element is a filter having a reflective coating that reflects light in a range of wavelengths centered about a center wavelength and transmits light outside the range of wavelengths, the center wavelength being dependent on the angle of incidence of light from the first port.

11. A device as recited in claim 10, wherein the optical element reflects light to a second port and transmits light to a third port.

12. A method of optical coupling, comprising:

providing a zoom lens unit defining an optical axis and having an adjustable effective focal length;

directing light in a direction substantially parallel to the optical axis from a first port disposed on a first side of the zoom lens unit and on a first side of the optical axis so as to generate a light beam from the zoom lens unit that is directed towards the optical axis and is incident on an optical element having an optical characteristic that is dependent on angle of incidence; and adjusting the effective focal length of the zoom lens unit so as to select the angle of incidence of light on the optical element.

13. A method as recited in claim 12, wherein adjusting the adjustable focal length of the zoom lens unit includes adjusting a separation between first and second lenses of the zoom lens unit.

14. A method as recited in claim 12, wherein the optical characteristic of the optical element is wavelength selective reflection, and further comprising reflecting light from the optical element, through the lens unit, to a second port, the light reflected to the second port being centered around a center wavelength that is dependent on the angle of incidence.

15. A method as recited in claim 14, further comprising transmitting light through the optical element and focusing the transmitted light to a third port.

* * * * *